(12) United States Patent
Terracciano et al.

(10) Patent No.: US 12,135,279 B2
(45) Date of Patent: Nov. 5, 2024

(54) HIGH ALTITUDE LASER OPTICAL SENSOR

(71) Applicant: University of Central Florida Research Foundation, Inc., Orlando, FL (US)

(72) Inventors: Anthony C. Terracciano, Orlando, FL (US); Subith S. Vasu, Orlando, FL (US); Francisco J. Gonzalez, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 184 days.

(21) Appl. No.: 17/980,379

(22) Filed: Nov. 3, 2022

(65) Prior Publication Data
US 2023/0213440 A1    Jul. 6, 2023

Related U.S. Application Data

(60) Provisional application No. 63/296,070, filed on Jan. 3, 2022.

(51) Int. Cl.
*G01N 21/3504* (2014.01)
*G01N 21/25* (2006.01)

(52) U.S. Cl.
CPC ....... *G01N 21/3504* (2013.01); *G01N 21/255* (2013.01)

(58) Field of Classification Search
CPC ............. G01N 21/255; G01N 21/3504; G01N 21/031; G01N 21/39; G01N 2201/0214; G01N 2201/0668

(Continued)

(56) References Cited

U.S. PATENT DOCUMENTS

| 8,502,148 B2 | 8/2013 | Wagner et al. |
| 9,194,744 B2 | 11/2015 | Yost et al. |
| 9,329,085 B2 | 5/2016 | Kotidis et al. |

FOREIGN PATENT DOCUMENTS

CN         104697947 B  *  9/2017

OTHER PUBLICATIONS

"Altitude above Sea Level and Air Pressure," https://www.engineeringtoolbox.com/air-altitude-pressure-d_462.html.
(Continued)

*Primary Examiner* — Tri T Ton
(74) *Attorney, Agent, or Firm* — Suiter Swantz IP (57) ABSTRACT

A high-altitude atmospheric sensor may include a frame configured to attach to a body of an aircraft, where the frame defines an open measurement cavity for air to travel through during flight of the aircraft. The sensor may further include one or more light sources providing input light such as mid-infrared quantum cascade lasers, a beamsplitter to separate the input light into measurement light propagating along a measurement path and reference light propagating along a reference path, one or more measurement cells providing optical paths for the measurement light in the open measurement cavity of the frame, one or more detectors to capture the measurement light from the one or more measurement cells and the reference light, and a controller to generate one or more spectroscopy measurements of air passing through the open measurement cavity during the flight of the aircraft.

20 Claims, 7 Drawing Sheets

(58) Field of Classification Search
USPC .......................................................... 356/300
See application file for complete search history.

(56) References Cited

OTHER PUBLICATIONS

Capasso, Frederico, "Freedom from band-gap slavery: from diode lasers to quantum cascade lasers," American Physical Society, APS April Meeting 2010, Feb. 13-16, 2010, abstract id. X4.002.

Li et al., Quantum cascade laser spectrometry techniques: a new trend in atmospheric chemistry, Li et al. Applied Spectroscopy Reviews, 48:523-559, 2013.

Terracciano, et al. "Hazardous Gas Detection Sensor Using Broadband Light-Emitting Diode-Based Absorption Spectroscopy for Space Applications." (2018).

Terracciano, et al., "Meteorological high altitude laser optical spectrometer (HALOS)", Proc. SPIE 12107, Infrared Technology and Applications XLVIII, 121071K (May 27, 2022).

Thurmond, et al., "A Light-Emitting Diode-(LED-) Based Absorption Sensor for Simultaneous Detection of Carbon Monoxide and Carbon Dioxide," Appl. Spectrosc. 70, 962-971 (2016).

Tomasi, et al., "Mean vertical profiles of temperature and absolute humidity from a 12-year radiosounding data set at Terra Nova Bay (Antarctica)", Atmospheric Research, vol. 71, No. 3, pp. 139-169, 2004.

\* cited by examiner

HIGH ALTITUDE LASER OPTICAL SENSOR

CROSS-REFERENCE TO RELATED APPLICATION

The present application claims the benefit under 35 U.S.C. § 119(e) of U.S. Provisional Application Ser. No. 63/296,070, filed Jan. 3, 2022, entitled HIGH ALTITUDE LASER OPTICAL SENSOR, naming Anthony C. Terracciano, Subith Vasu, and Francisco J. Gonzalez as inventors, which is incorporated herein by reference in the entirety.

GOVERNMENT LICENSE RIGHTS

This invention was made with government support under DE-SC0021488 awarded by Department of Energy. The government has certain rights in the invention.

TECHNICAL FIELD

The present disclosure relates generally to atmospheric sensing and, more particularly, to aircraft-mounted high-altitude atmospheric sensing.

BACKGROUND

High-altitude atmospheric measurements are valuable for many pressing challenges including climate science and weather forecasting. For example, measurements such as water vapor concentration (e.g., humidity), temperature, and pressure are critical for understanding cloud formation. However, obtaining such measurements accurately, reliably, and with high sensitivity remains challenging. There is therefore a need to develop systems and methods to cure the above deficiencies.

SUMMARY

A high-altitude atmospheric sensor is disclosed in accordance with one or more illustrative embodiments of the present disclosure. In one illustrative embodiment, the sensor includes a frame configured to attach to a body of an aircraft, wherein the frame defines an open measurement cavity for air to travel through during flight of the aircraft. In another illustrative embodiment, the sensor includes one or more light sources providing input light. In another illustrative embodiment, the sensor includes a beamsplitter to separate the input light into measurement light propagating along a measurement path and reference light propagating along a reference path. In another illustrative embodiment, the sensor includes one or more measurement cells providing optical paths for the measurement light in the open measurement cavity of the frame. In another illustrative embodiment, the sensor includes one or more detectors to capture the measurement light from the one or more measurement cells and the reference light. In another illustrative embodiment, the sensor includes a controller to generate one or more spectroscopy measurements of air passing through the open measurement cavity during the flight of the aircraft.

A method is disclosed in accordance with one or more illustrative embodiments of the present disclosure. In one illustrative embodiment, the method includes flowing air through a frame attached to a body of an aircraft, where the frame defines an open measurement cavity for air to travel through during flight of the aircraft. In another illustrative embodiment, the method includes generating one or more spectroscopy measurements of air passing through the open measurement cavity during the flight of the aircraft. In another illustrative embodiment, the measurements are generated by providing input light with one or more light sources; separating the input light into measurement light propagating along a measurement path and reference light propagating along a reference path, where the measurement path includes a path through one or more measurement cells providing optical paths for the measurement light in the open measurement cavity of the frame; capturing the measurement light from the one or more measurement cells and the reference light with one or more detectors; and generating the one or more spectroscopy measurements with signals from the one or more detectors.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for high-altitude atmospheric measurements including, but not limited to, measurements of water vapor concentration (e.g., humidity), temperature, and pressure.

Some embodiments of the present disclosure are directed to a high-altitude laser optical sensor (HALOS) which includes a mid-infrared (mid-IR) spectrometer and is suitable for mounting on and/or integrating with an aircraft to provide atmospheric measurements as the aircraft is in flight.

In some embodiments, the HALOS includes one or more light sources to provide input light, an open measurement cavity operating as a sample cavity through which air or other gases to be measured may flow, and one or more detectors. For example, the HALOS may include a beamsplitter to split the input light into a measurement beam that propagates along a measurement path passing through the open measurement cavity and a reference beam that propagates along a reference path not exposed to the gas or air to be measured.

The light sources may include, but are not limited to, one or more quantum cascade lasers (QCLs) providing tunable narrowband emission at relatively high repetition rates (e.g., 1 kHz, 100 kHz, or beyond), which may be swept through a spectral band of interest to provide rapid, broadband spectroscopic measurements of the atmosphere during flight. It is contemplated herein that the spatial resolution of an atmospheric measurement may be improved by increasing the repetition rate of the associated light source and thus correspondingly decreasing the sampling period which is inversely related to the repetition rate. In particular, the spatial resolution of an atmospheric measurement may be associated with a distance traveled by an aircraft with the HALOS during a sampling period. Further, multiple light sources may be utilized to provide simultaneous measurements at different wavelengths and/or measurement lengths. As a non-limiting illustration, simultaneous measurements may enable the simultaneous characterization of high and low vapor concentrations (e.g., at the interface of a cloud).

In some embodiments, a length of the measurement path through the open measurement cavity is adjustable. For example, the HALOS may include various optics to provide one or more measurement cells. Further, at least one of the measurement cells may be a multi-pass cell, where the length of the measurement path may be adjusted by adjusting a number of passes of the measurement light through the multi-pass cavity. It is contemplated herein that an adjustable path length may facilitate measurements in a wide range of temperature and pressure conditions. For example, the water vapor concentration may vary by approximately 6 orders of magnitude for relevant measurement conditions ranging from typical temperatures and pressures to supersaturation conditions. As a result, varying measurement lengths may facilitate sensitive measurements across such wide-ranging conditions.

Some embodiments of the present disclosure are directed to systems and methods for performing high-altitude spectroscopy. For example, some embodiments of the present disclosure are directed to mounting or otherwise integrating an infrared (IR) spectrometer such as HALOS onto an aircraft.

In some embodiments, the HALOS includes a frame defining the open measurement cavity through which air to be measured may freely pass through. The frame may be attached to or otherwise integrated with the body of an aircraft such that the open measurement cavity may be exposed to air (e.g., atmosphere) for sampling as the aircraft is in motion at any selected altitude for measurements. The frame, or any portion thereof, may further have any shape including, but not limited to, an airfoil to control the aerodynamics of the HALOS, mitigate vibrations from aero-thermo-elastic loading, or the like.

In some embodiments, a portion of the components associated with the HALOS such as, but not limited to, electro-optical components are packaged to allow for mounting in a location internal to the aircraft. It is contemplated herein that such a design may provide numerous benefits including, but not limited to, controlling the aerodynamics of the HALOS, reducing the footprint of the HALOS beyond the body of the aircraft, improving mechanical rigidity and associated measurement sensitivity, or shielding these components from exposure to external conditions.

In some embodiments, at least a portion of the components associated with the HALOS located internal to the aircraft are located in a housing providing a positive pressure environment of a selected gas composition (e.g., nitrogen, or the like). For example, it is contemplated herein that providing components such as, but not limited to, the reference detector, the laser sources, or at least some of the optical elements associated with the system in a housing with positive pressure may mitigate spectral dispersion and thus enable a high precision reference or zero measurement. As a result, the accuracy and/or sensitivity of a corresponding atmospheric measurement may be improved relative to alternative configurations.

In some embodiments, the HALOS includes at least one variable geometry mirror (e.g., deformable mirror, or the like) to provide flexible and/or dynamic coupling of the measurement light to and/or from the open measurement cell. In this way, the HALOS may flexibly maintain a stable path of the measurement light over a wide range of atmospheric conditions (e.g., temperatures).

High altitude meteorological sensing is described generally in Anthony C. Terracciano, et al., "Meteorological high altitude laser optical spectrometer (HALOS)", Proc. SPIE 12107, Infrared Technology and Applications XLVIII, 121071K (27 May 2022), which is incorporated herein by reference in its entirety.

Figure 1A:
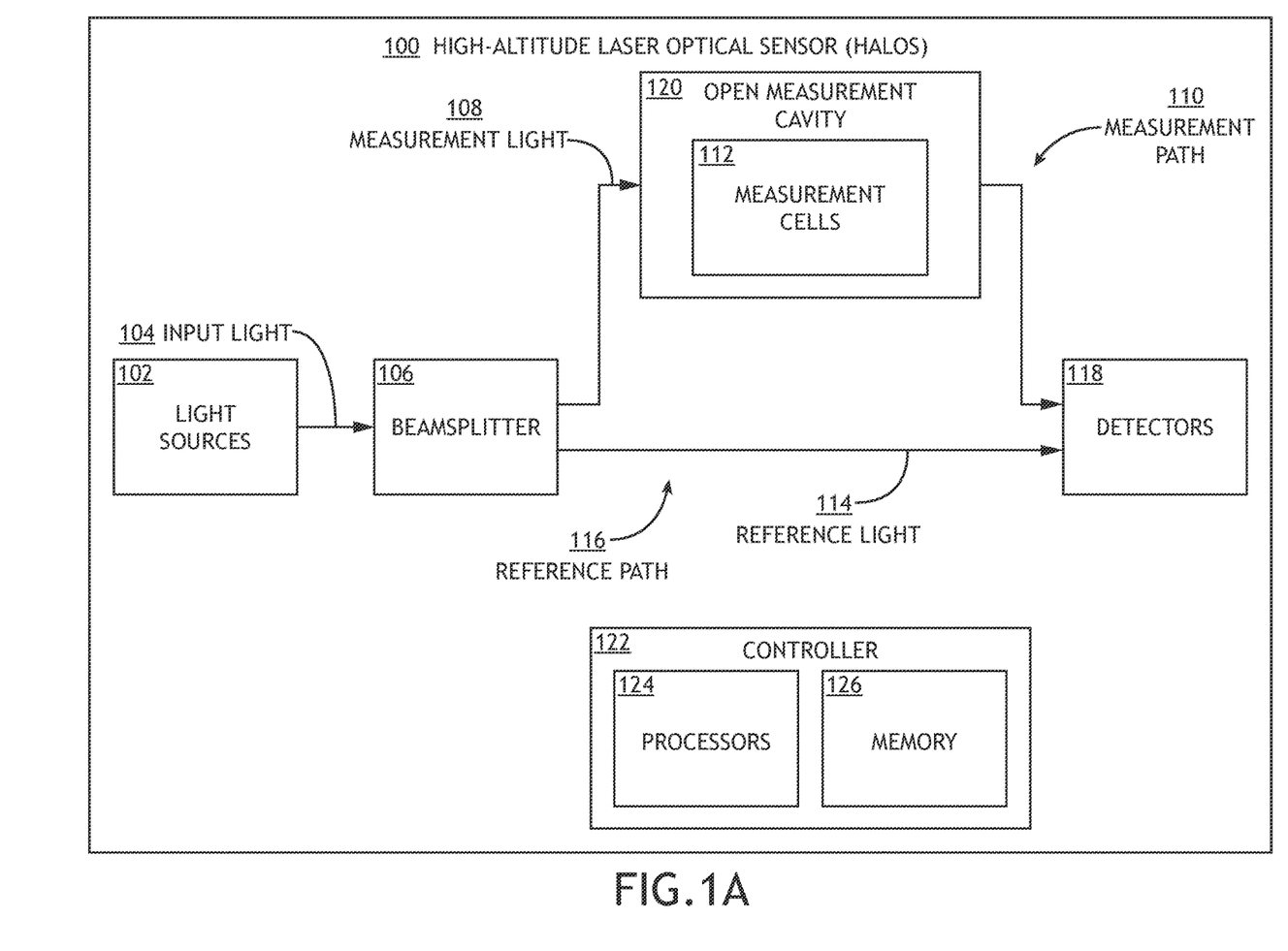
FIG. 1A is a conceptual block diagram of a high-altitude laser optical sensor (HALOS), in accordance with one or more embodiments of the present disclosure.
Figure 1B:
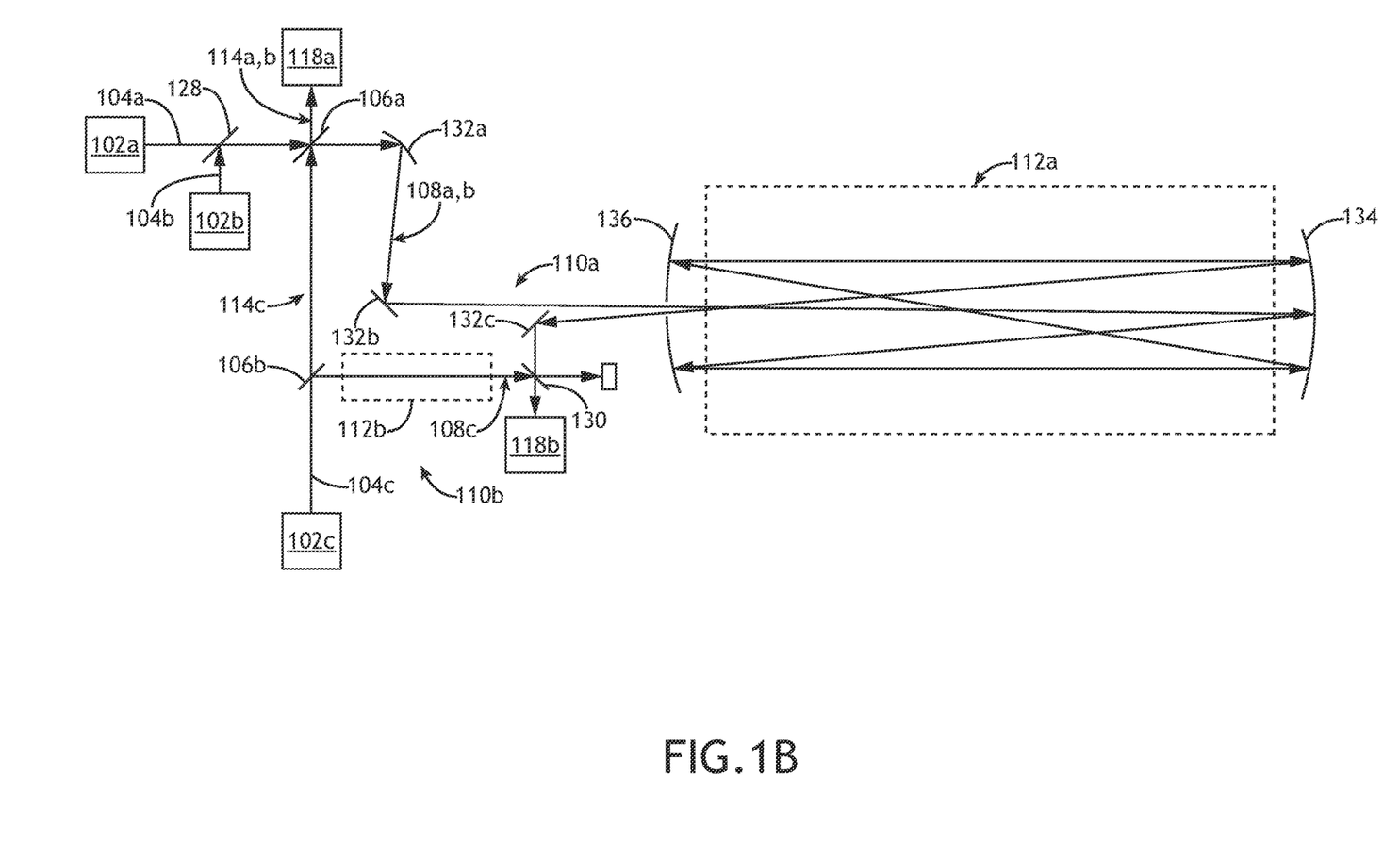
FIG. 1B is a simplified schematic of a HALOS having three light sources and two measurement cells, in accordance with one or more embodiments of the present disclosure.
Figure 1C:
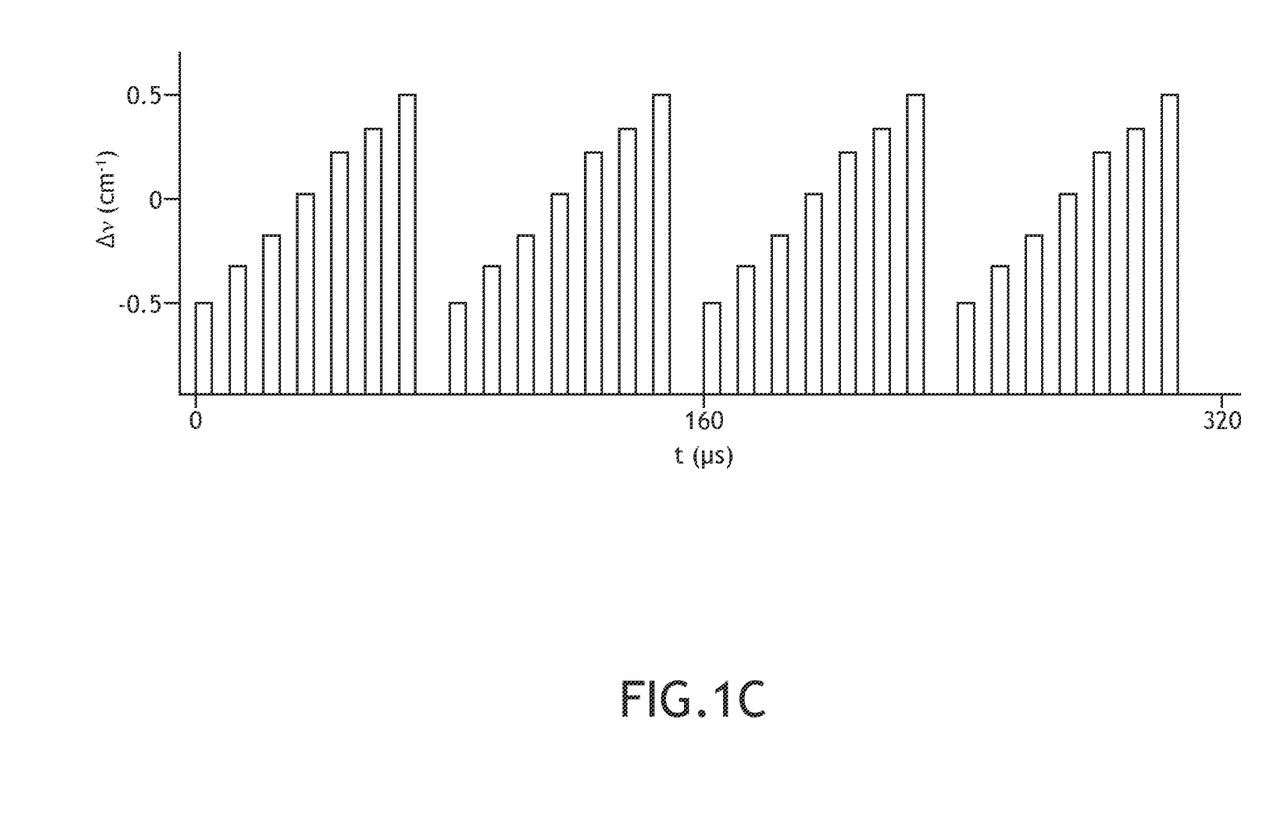
FIG. 1C is a plot of the modulation of the wave number of input light using a ramp pattern, in accordance with one or more embodiments of the present disclosure.
Figure 1D:
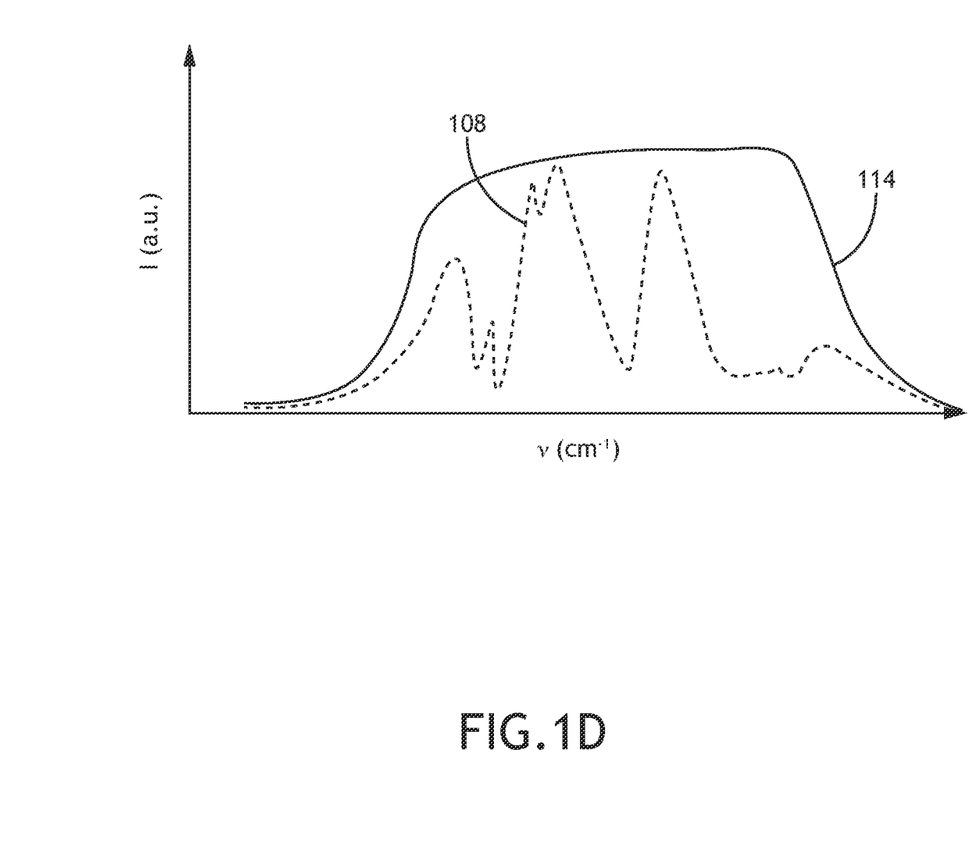
FIG. 1D is a conceptual plot illustrating detected spectra associated with atmospheric measurement, in accordance with one or more embodiments of the present disclosure.
Figure 1E:
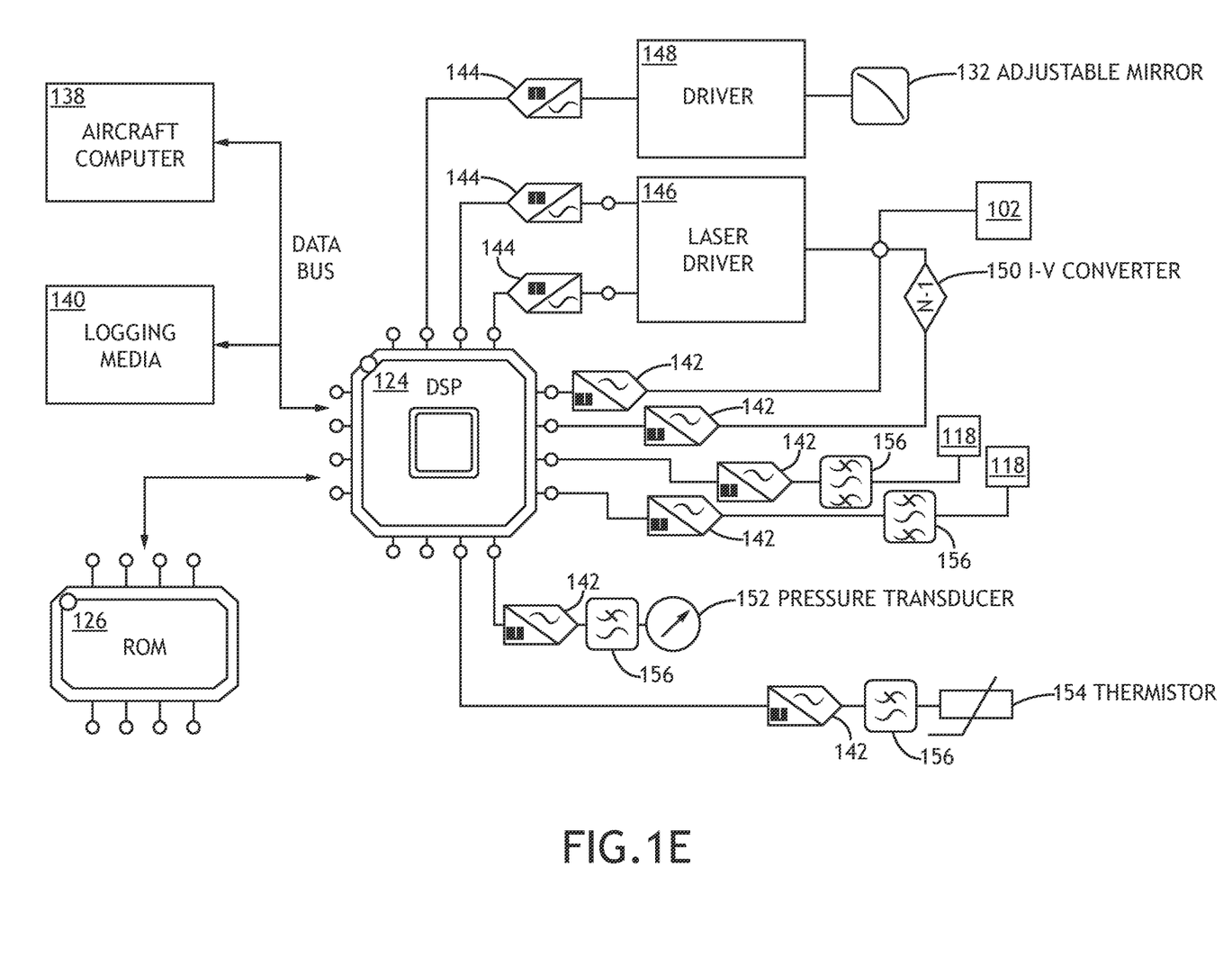
FIG. 1E is a conceptual view of information processing flow in the HALOS in accordance with one or more embodiments of the present disclosure.
Figure 2:
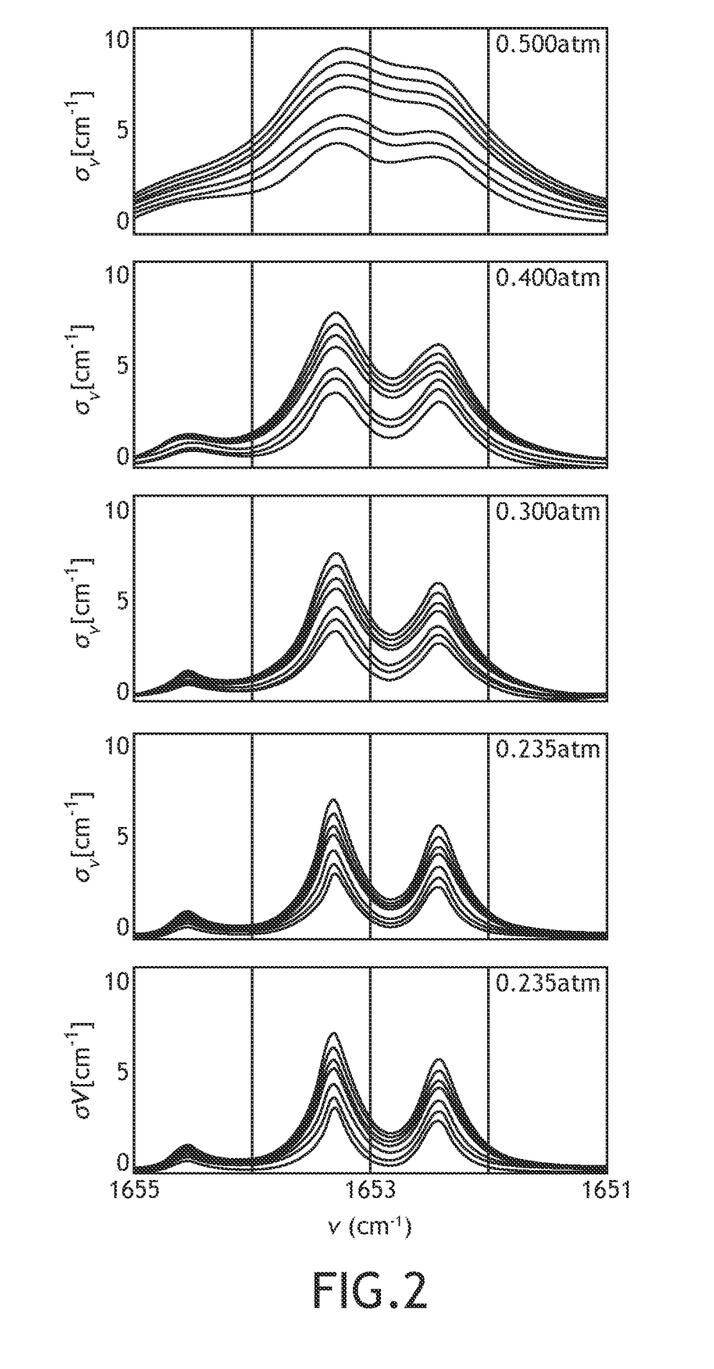
FIG. 2 is a plot of the water band $\sigma_v$ spectrum at several temperatures and pressures, in accordance with one or more embodiments of the present disclosure.
Figure 3:
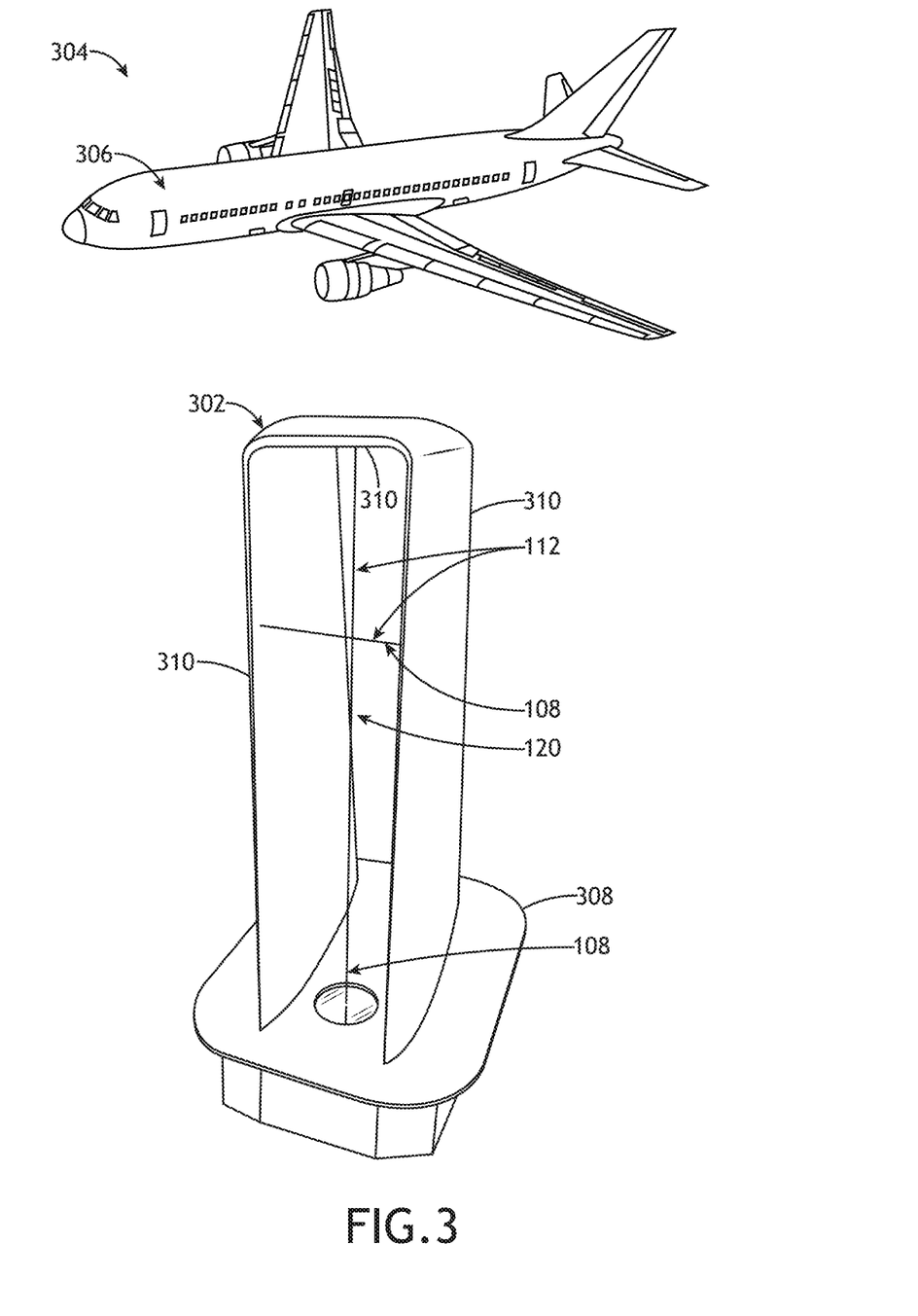
FIG. 3 is a perspective view of the frame, in accordance with one or more embodiments of the present disclosure.

Referring now to FIGS. 1-3, systems and methods for high-altitude optical sensing are described in greater detail, in accordance with one or more embodiments of the present disclosure.

FIG. 1A is a conceptual block diagram of a HALOS 100, in accordance with one or more embodiments of the present disclosure.

In some embodiments, the HALOS 100 includes one or more light sources 102 to generate input light 104, at least one beamsplitter 106 to split the input light 104 into measurement light 108 propagating along at least one measurement path 110 including one or more measurement cells 112 and reference light 114 propagating along a reference path 116, and one or more detectors 118 to generate detection signals associated with the measurement light 108 and the reference path 116. Further, the one or more measurement cells 112 may be positioned within at least one open measurement cavity 120 through which air (e.g., atmosphere) may freely flow during a measurement. In contrast, the reference light 114 is not exposed to the atmosphere being measured. For example, the reference path 116 may be located in housing (e.g., an enclosure) and/or within a body of an aircraft on which the HALOS 100 is installed. Further, in some embodiments, any of the reference paths 116 may include a housing with a controlled atmosphere (e.g., a controlled composition, temperature, and/or pressure) to provide a consistent reference for accurate and sensitive measurements of the atmosphere flowing through the measurement cell 112.

In some embodiments, the HALOS 100 further includes a controller 122 including one or more processors 124 configured to execute program instructions maintained in a memory 126, or memory device. The controller 122 may be communicatively coupled to any of the components of the HALOS 100 including, but not limited to, the light sources 102 or the detectors 118. In this way, the controller 122 may receive data from and/or direct (e.g., via control signals) any of the coupled devices. The controller 122 may thus perform any of the steps described throughout the present disclosure such as, but not limited to, driving the light sources 102 (e.g., controlling a spectrum of the input light 104), receiving detection signals from the detectors 118, or generating atmospheric measurements based on the detection signals.

Various aspects of the HALOS 100 are now described in greater detail, in accordance with one or more embodiments of the present disclosure.

The HALOS 100 may generally include any number and type of light sources 102 suitable for spectroscopic analysis of the atmosphere at selected atmospheric conditions. Each of the light sources 102 may provide input light 104 having any wavelength and/or repetition rate suitable for spectroscopic analysis of the atmosphere at selected atmospheric conditions.

Any light source 102 may provide input light 104 with any wavelength in any spectral region such as, but not limited to, the ultraviolet (UV), visible, or IR spectral regions. In some embodiments, at least one light source 102 provides input light 104 in a mid-infrared (MIR) spectral range, which may generally be characterized by wavelengths ranging from approximately 3-10 micrometers (μm) and includes multiple absorption lines relevant to atmospheric measurements including, but not limited to 6.3 μm (1580 cm$^{-1}$) or 6.05 μm (1653 cm$^{-1}$).

Any light source 102 may further provide input light 104 within any spectral range or bandwidth.

In some embodiments, at least one light source 102 provides light within a selected spectral range, which may be characterized as broadband light. Such broadband light may have any bandwidth. For example, such broadband light may have a bandwidth that spans at least two absorption lines of interest associated with the atmosphere.

In some embodiments, at least one light source 102 provides narrowband input light 104 with a relatively small bandwidth around a central wavelength. This wavelength may optionally be swept or otherwise tuned (e.g., by the controller 122) to provide broadband spectroscopic measurements (e.g., of multiple absorption lines) at any selected wavelengths or range of wavelengths. In some embodiments, the wavelength (or wave number) of a light source 102 is swept across an operational range in a periodic pattern such as, but not limited to, a sinusoidal pattern, a ramp pattern, or the like. As an illustration, FIG. 1C is a plot of the modulation of the wave number (v) of the input light 104 using a ramp pattern, in accordance with one or more embodiments of the present disclosure. FIG. 1D is a conceptual plot illustrating detected spectra associated with atmospheric measurement, in accordance with one or more embodiments of the present disclosure. The plot in FIG. 1D may, for example, be generated in a single acquisition using a broadband light source 102 or through sequential acquisition using a wavelength-swept narrowband light source 102.

In some embodiments, the light sources 102 include at least one QCL such as, but not limited to, a distributed feedback (DFB) QCL. For example, at least one of the light sources 102 may include a DFB QCL providing a single longitudinal mode with a tunable wavelength in the MIR spectral region. It is contemplated herein that QCLs have various properties that make them well-suited for atmospheric sensing such as, but not limited to, a broad tunable wavelength range, high laser power output, a shallow divergence angle, and a narrow linewidth. For example, QCLs may have relatively high repetition rates such as, but not limited to, greater than 1 kHz, which may enable rapid measurements. In some instances, the HALOS may include one or more QCLs having repletion rates of approximately 100 kHz or greater. It is further contemplated herein that a MIR DFB QCL represents a new and unique source that is well-suited for atmospheric spectroscopy.

As an illustration, it is recognized herein that typical hygrometers suitable for probe water vapor concentrations and temperature aboard aircraft are limited by an upper sampling frequency of 25 Hz, which aboard an aircraft with a 490-knot airspeed (e.g., a Gulfstream V, or any suitable aircraft) may yield a nominal spatial resolution of approximately 10 m associated with a linear travel volume of atmosphere at a given speed in a sampling period. In contrast, a non-limiting example of a HALOS with a QCL as a light source 102 with a repetition rate of at least 100 kHz may surpass such typical hygrometers by providing higher spatial resolution on the order of 25 cm as well as superior accuracy (<4%) over a large temperature range (e.g., from the low Frost Point ($T_{frost}$) of −110° C. to dew points ($T_{dew}$) at 35° C.). Further, such a system may characterize parts-per-million (ppm) water vapor concentrations or below (e.g., sub-ppm concentrations) at altitude or supersaturated conditions at ground level.

The light sources 102 may further provide input light 104 having any spectral or temporal distribution suitable for atmospheric spectroscopy. In some embodiments, the input light 104 is pulsed or otherwise modulated with any selected repetition rate, though increasing the repetition rate may generally increase the potential measurement speed in general and for swept-source spectroscopy in particular. As non-limiting illustrations, a QCL may have a repetition rate of 1 kHz, 100 kHz, or the like. In some embodiments, the controller 122 implements lock-in techniques to provide high-sensitivity measurements of pulsed input light 104. Such modulation enables various benefits including, but not limited to, the abatement of 1/f noise or the mitigation of constant sources of error such as sunlight (e.g., resulting in a DC error) or dust obfuscation (e.g., resulting in a sub 10 kHz error). Additionally, the modulation process also reduces any problems associated with beam steering associated with density gradients should they arise due to supersaturation conditions.

The HALOS 100 may include any number or type of detectors 118 suitable for receiving any of the light sources 102. In some embodiments, at least one detector 118 may include a single-pixel sensor, but is not limited to, a photodiode, an avalanche photodiode, or a photomultiplier tube. Such a detector 118 may be suitable for, but is not limited to, measuring an intensity of narrowband measurement light 108 (e.g., after interacting with atmosphere) and/or reference light 114. In some embodiments, at least one detector 118 includes a multi-pixel sensor such as, but not limited to, a complementary metal-oxide-semiconductor (CMOS) sensor, a charge-coupled device (CCD), or the like. Such a detector may be suitable for, but is not limited to, simultaneous spectroscopic measurements of the intensities of multiple wavelengths associated with broadband measurement light 108 and/or reference light 114.

The HALOS 100 may include any number of measurement cells 112 having the same or different lengths. These measurement cells 112 may further be located in any number of open measurement cavities 120 through which air (e.g., atmosphere) to be analyzed may flow during a measurement. Further, any number of light sources 102 may directed through any of the measurement cells 112. In this way, the HALOS 100 may be tailored for measurements under a wide range of atmospheric conditions (e.g., a wide range of water vapor concentrations).

As a non-limiting illustration, FIG. 1B is a simplified schematic of a HALOS 100 having three light sources 102a-c and two measurement cells 112a,b, in accordance with one or more embodiments of the present disclosure.

In FIG. 1B, the light sources 102a,b are coupled to a first measurement cell 112a and the light source 102c is coupled to a second measurement cell 112b, where the first measurement cell 112a is a multi-pass cell and the second measurement cell 112b is a single-pass cell. For example, the HALOS 100 includes a beamsplitter 128 (or any suitable beam combiner more generally) to combine the input light 104a,b and a first beamsplitter 106a to split the input light 104a,b into measurement light 108a,b and reference light 114a,b. The HALOS 100 further includes a second beamsplitter 106b to split the input light 104c into measurement light 108c and reference light 114c. In this configuration, the measurement light 108a,b propagates along a first measurement path 110a that includes the first measurement cell 112a and the measurement light 108c propagates along a second measurement path 110b that includes the second measurement cell 112b. An additional beamsplitter 130 (or beam combiner more generally) then combines the measurement light 108a-c from both measurement cells 112a,b onto a common detector 118a (e.g., a measurement detector). Similarly, reference paths 116a-c may at least partially overlap to provide that the reference light 114a-c from all light sources 102a-c is incident on a common detector 118b (e.g., a reference detector). Further, at least a portion of the HALOS 100 including the reference paths 116 may be located in a housing (e.g., an enclosure) providing a reference atmosphere with controlled composition, temperature, and/or pressure.

The HALOS 100 may further include various optical elements to manipulate light at any point throughout the system. As an example, the HALOS 100 may include various mirrors 132 (e.g., flat and/or focusing mirrors) to direct light along any desired path. As another example, though not shown, the HALOS 100 may include various additional optical elements such as, but not limited to, polarizers, spectral filters, or spatial filters. Further, any of the beamsplitters 106, 128, 130 may be polarized, unpolarized, broadband, or spectrally selective to provide desired beam splitting or beam combining performance.

Measurements using any combination of the light sources 102a-c and the measurement cells 112a,b may be performed simultaneously or sequentially. In some embodiments, any of the light sources 102a-c are operated alone such that a measurement of the atmosphere flowing through an associated measurement cell 112 may be generated based on the corresponding measurement and reference signals from the detectors 118a,b. In some embodiments, two or more of the light sources 102a-c are operated simultaneously such that the signals generated by the detectors 118a,b may be representative of multiple simultaneous measurements. These simultaneous measurements may be extracted using any technique known in the art. For example, the light sources 102a-c may be configured to generate corresponding input light 104a-c at different repetition rates, which may allow differentiation of the associated data from the signals generated by the detectors 118a,b based on these repetition rates (e.g., using demultiplexing, lock-in amplification, or any other suitable techniques). As another example, the light sources 102a-c may be configured to generate corresponding input light 104a-c at different wavelengths, which may allow differentiation of the associated data from the signals generated by the detectors 118a,b based on wavelength. As an illustration, the detectors 118 may be wavelength-sensitive (e.g., spectroscopic detectors). As another illustration, the HALOS 100 may include multiple sets of detectors 118 coupled with spectral filters or dichroic mirrors for measurements of different wavelengths or wavelength ranges.

It is to be understood that the depiction of the HALOS 100 in FIG. 1B is provided solely for illustrative purposes and should not be interpreted as limiting. For example, the HALOS 100 may include any number or configuration of light sources 102, measurement cells 112, and/or detectors 118 (e.g., measurement detectors and/or reference detectors).

The HALOS 100 may provide selectable, and/or tunable measurements to provide different measurement conditions such as, but not limited to, different combinations of wavelength, repetition rate, or measurement cell 112 length.

It is contemplated herein that atmospheric sensing may require analysis of a wide range of measurement conditions including temperatures, pressures, and saturation levels (e.g., including supersaturation conditions), which may vary as a function of altitude and weather. As a non-limiting illustration, for altitudes ranging from 0-15 km, the temperature may range from around 200-300 K, the ambient pressure may range from around 0.1-1 atm, and the absolute humidity may range from around 10-5 to 10-1 mol/m³. The temperature and humidity properties of air as a function of altitude are generally described in C. Tomasi, et al., Atmospheric research 71, 139-169 (2004); A. C. Terracciano, et al., New Space 6, 28-36 (2018); and "Altitude above Sea Level and Air Pressure," https://www.engineeringtoolbox.com/air-altitude-pressure-d_462.html; both of which are incorporated herein by reference in their entireties, though it is to be understood that such descriptions are not limiting on the performance of the HALOS 100.

It is further contemplated herein that different measurement path lengths (e.g., optical path lengths of measurement light 108 through a measurement cell 112) may be facilitate accurate and sensitive measurements across such varied conditions.

For low species concentration $\chi_i$ [ppm] or short measurement path length L [cm], absorption at wavenumber $\nu$ [cm⁻¹] may be quantified by the Beer-Lambert law $$\alpha_\nu = -\ln\left(\frac{I}{I_0}\right) = \sigma_\nu \chi_i L \qquad (1)$$

where $\alpha_\nu$ is the absorbance, I and $I_0$ are the transmitted and incident intensities, and $\sigma_\nu$ [cm⁻¹] is the species absorption cross section. For water, $\sigma_\nu$ is accurately tabulated in the HITRAN database. At high L or $\chi_i$, a direct calibration is typically needed due to non-linear processes.

As an illustration, water has several absorption lines around 1580 cm⁻¹ (6.3 µm wavelength), which is well separated from features of other atmospheric constituents such as $CO_2$ and CO. FIG. 2 is a plot of the water band $\sigma_\nu$ spectrum at several temperatures and pressures, in accordance with one or more embodiments of the present disclosure. The narrow range 1651-1655 cm$^{-1}$ has three resolved features: (A) 1645.5 cm$^{-1}$, (B) 1653.25 cm$^{-1}$, (C) 1652.5 cm$^{-1}$. Commercial DFB QCLs are available to scan this range.

Line-widths depend strongly on pressure, particularly for (B) and (C). At a given pressure, peak heights depend strongly on temperature. The second mixed partial derivatives $$\frac{\delta \sigma_v}{\delta v \delta T_P} \text{ and } \frac{\delta \sigma_v}{\delta v \delta P_T}$$

enable response to supersaturation conditions upon entering/exiting a cloud. Values of $$\sigma_v, \frac{\delta \sigma_v}{\delta v \delta T_P} \text{ and } \frac{\delta \sigma_v}{\delta v \delta P_T}$$

may be stored in lookup tables for the rapid lookup of possible states and implement a residual minimization routine to identify suitable conditions.

It is contemplated herein that the measurement parameters of the HALOS 100 may be tailored to characterize such a spectra over a range of varying weather conditions. Assuming a non-limiting case of a 1% noise level, the detection limit (DL) may occur when $I_{DL}=0.99 I_0$, where the signal to noise ratio (SNR) is unity. Similarly, the saturation limit (SL) may occur at $I_{SL}=0.01 I_0$. Absorbance $\alpha_v$ at DL and SL (see Equation (2)) define minimum L and saturation concentration $\chi$ according to the Equations (3) and (4), with an overall estimated uncertainty parameter $\Delta_1$. The latter accounts for 10% additional uncertainty in (4) and $\Delta 2=3$ which accounts for a nonlinear saturation phenomenon occurring at combinations of "high content" and "long" path lengths which is generally described in K. Thurmond, et al., Applied Spectroscopy 70, 962-971 (2016), which is incorporated by reference herein in its entirety.

$$\begin{bmatrix} \alpha_{v,DL} \\ \alpha_{v,SL} \end{bmatrix} = \begin{bmatrix} -\ln(.99) \\ -\ln(.01) \end{bmatrix} \quad (2)$$

$$L_{min} = \frac{\alpha_{v,DL}}{\sigma_v \chi_i (1-\Delta_1)} \quad (3)$$

$$\chi_{SL} = \frac{\alpha_{v,SL}}{\sigma_v L_{min} \Delta_2} \quad (4)$$

Further, the total range of operating conditions (e.g., temperature, pressure, or the like) may typically be considered when determining suitable measurement lengths (e.g., lengths of a measurement cell 112). Assuming a non-limiting minimum detection limit at 200 K, 0.1 atm, and absolute humidity of $2 \cdot 10^{-5}$ mol/m$^3$ (0.36 mg/m$^3$), a low-end detection limit may be 3 ppm for water vapor. The features shown in FIG. 2 exhibit a baseline absorbance of $\sigma\_v=1.0$ cm$^{-1}$, and thus from Equation (3), suggest a length of a measurement cell 112 of at least Lmin=25 m.

In a similar fashion, through equation (4) by using the assumed $\sigma_{v=}8.1$ cm$^{-1}$, the saturation limit may be $\chi_i=76$ ppm or 0.5 mmol/m$^3$. However, by using Equation (5) with $\chi_{sat}$ at some temperature (T) and pressure (P), the maximum absorbance $\sigma_{max}$ can be obtained and thus scanning regions can be defined. For super saturation at 315 K and 1.1 atm, a desirable length of a measurement cell 112 may be $L_{min}=3.7$ cm.

As a result, since the expected water vapor concentration can vary by approximately 6 orders of magnitude, a useful range of measurement lengths in this non-limiting example may range from approximately 3 cm to 30 m.

It is contemplated herein that the HALOS 100 may support multiple lengths of a measurement cell 112 in various ways. In some embodiments, the HALOS 100 may include multiple measurement cells 112 with different lengths. For example, FIG. 1B depicts a non-limiting illustration of the HALOS 100 with a multi-pass measurement cell 112a and a single-pass measurement cell 112b providing different lengths.

In some embodiments, a length of at least one measurement cell 112 is tunable. The length of a measurement cell 112 may be tuned using any suitable technique. For example, the length of a measurement cell 112 may be adjusted by placing one or more mirrors or other optical elements on one or more translation stages to generate a tunable optical path, which is sometimes referred to as a tunable optical delay line. As another example, the length of a multi-pass measurement cell 112 may be adjusted by controlling a number of times light (e.g., measurement light 108) propagates between mirrors defining the multi-pass measurement cell 112. For instance, the number of times light (e.g., measurement light 108) propagates between mirrors defining a multi-pass measurement cell 112 may be adjusted by controlling an angle of incidence of such light on the mirrors. Additionally, the HALOS 100 may include adjustable elements (e.g., mirrors with adjustable rotation angles and/or positions, variable geometry optical elements, deformable optical elements, or the like) to control a path of measurement light 108 entering and/or exiting the multi-pass measurement cell 112 to provide a desired cell length as well as ensure that measurement light 108 exiting the multi-pass measurement cell 112 is directed to the associated detector 118. Further, it is recognized that a multi-pass measurement cell 112 may generally include any number or combination of mirrors, which may be curved or flat. Further, one or more mirrors of a multi-pass measurement cell 112 may have a hole or aperture, which may facilitate near-normal incidence angles and relatively high numbers of passes.

Considering the multi-pass measurement cell 112a of FIG. 1B as an illustration, the multi-pass measurement cell 112a may include a first mirror 134 a second mirror 136. In this configuration, a number of times light propagates between the first mirror 134 and the second mirror 136 may be controlled by positions and/or rotations of at least one of the mirrors 132a,b. Further, the rotation angle and/or position of the mirror 132c may be adjustable to direct the measurement light 108 to the detector 118. To accomplish this, any of the mirrors 132a-c may be adjustable by actuators (e.g., piezoelectric actuators, or the like) or may be formed as deformable components.

In a general sense, a multi-pass measurement cell 112 may generally have any tunable range. In some embodiments, the HALOS 100 provides a tunable measurement length ranging from centimeters to meters. For example, the HALOS 100 may have, but is not limited to, a tunable measurement length ranging from approximately 3 cm to approximately 30 m based on the calculations above. Further, the measurement length may be rapidly adjustable through the use of piezoelectric actuation or other suitable technique for adjusting optical elements that control a path through the multi-pass measurement cell 112. As an illustration, the HALOS 100 may provide, but is not limited to, sub 20 millisecond response times suitable for water vapor measurements when entering or exiting highly discontinuous water vapor regions (e.g., flanking lines, or the like).

Referring now to FIG. 1E, operational flow of signals and data in the HALOS 100 is described in greater detail, in accordance with one or more embodiments of the present disclosure.

The one or more processors 124 of the controller 122 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 124 may include any device configured to execute algorithms and/or instructions (e.g., program instructions stored in memory). Moreover, different subsystems of the HALOS 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 122 may include one or more controllers housed in a common housing or within multiple housings. In this way, any controller or combination of controllers may be separately packaged as a module suitable for integration into the HALOS 100.

The memory 126 may include any storage medium known in the art suitable for storing program instructions executable by the associated one or more processors 124. For example, the memory 126 may include a non-transitory memory medium. By way of another example, the memory 126 may include, but is not limited to, a read-only memory (ROM), a random-access memory (RAM), a magnetic or optical memory device (e.g., disk), a magnetic tape, a solid-state drive and the like. It is further noted that the memory 126 may be housed in a common controller housing with the one or more processors 124. In some embodiments, the memory 126 may be located remotely with respect to the physical location of the one or more processors 124 and the controller 122. For instance, the one or more processors 124 of the controller 122 may access a remote memory (e.g., server), accessible through a network (e.g., internet, intranet and the like).

In particular, FIG. 1E is a conceptual view of information processing flow in the HALOS 100 in accordance with one or more embodiments of the present disclosure. In FIG. 1E, the controller 122 includes a digital signal processor (DSP). However, it is to be understood that FIG. 1E includes depictions of various components of the HALOS 100 including, but not limited to, components associated with the controller 122 and further to be understood that FIG. 1E is provided solely for illustrative purposes and should not be interpreted as limiting.

In some embodiments, the controller 122 provides control signals to drive the light sources 102 (e.g., modulation control, current control, temperature control, or the like). In some embodiments, the controller 122 acquires feedback signals from one or more sensing probes (not shown) to accurately track the output of the light sources 102. The controller 122 may further provide real-time analysis of the absorption measurements (e.g., associated with analysis of data from the detectors 118. In some embodiments, the controller 122 is communicatively coupled to and may send data to external systems such as, but not limited to, an aircraft computer 138 or logging media 140.

As a redundancy measure, the controller 122 may also provide data logging to a standard format removable device (e.g., a USB thumbdrive or SD card). The controller 122 may support high-speed rapidly deployable standard interfaces such as Rapido Ver. 2, PCI Express Gen 2, USB 3.0, Gigabit Ethernet, and/or well as legacy communications interfaces such as I2C and RS-232. Depending on the communication capabilities of the aircraft computer 138, a high-speed communication interface could be used to increase the frequency of operation of the system.

The controller 122 may be communicatively coupled with any of the components of the HALOS 100 to receive data and/or provide control signals. As illustrated in FIG. 1E, the controller 122 may communicate with intermediary control electronics through multichannel analog to digital converters (ADCs) 142 and/or digital to analog converters (DACs) 144. The controller 122 may also include a ROM chip (e.g., memory 126) which may store a lookup table to for the enabling of "FAST" matching without the need to use numerous process cycles.

For example, the controller 122 may be communicatively coupled with the light sources 102 either directly or through a laser driver 146 to control various aspects of the input light 104 such as, but not limited to, the intensity, repetition rate, or wavelength. As an illustration, the controller 122 may control a wavelength (or wave number) of the input light 104 in a selected pattern (e.g., a periodic pattern for wavelength-swept metrology as depicted in FIG. 1C).

As another example, the controller 122 may be communicatively coupled with one or more adjustable mirrors (e.g., mirrors 132a-c in FIG. 1B) either directly or through a driver 148. As an illustration, the controller 122 may control a length of one or more measurement cells 112.

In some embodiments, the controller 122 provides control of the input light 104 parameters (e.g., wavelength, or the like) of at least one light source 102 and/or the length of at least one measurement cell 112 based on signals from additional components in the HALOS 100. For example, output from a laser driver 146 may be split and converted (e.g., with a current-voltage (I-V) converter 150) to an analog waveform with current and voltage characteristics. As an illustration, FIG. 1E depicts a configuration in which such voltage and current characteristics are collected provided to the controller 122 through two ADCs 142. In some cases, raw signals sent to the light sources 102 are directly sent to the controller 122 (e.g., without filtering to remove artifact signals), though in some cases filtering may be used. Further, signals from the detectors 118 may also be fed back to the controller 122 via ADCs 142.

In some embodiments, direct measurements of ambient atmospheric pressure and temperature via sensors such as, but not limited to, a pressure transducer 152 or a thermistor 154 are provided to the controller 122.

Further, the HALOS 100 may include various filters 156 (e.g., low-pass filters, or the like) to manipulate any signals received by the controller 122. For example, since the pressure transducer 152 and/or the thermistor 154 may provide relatively low-speed measurements (e.g., with response times on the order of 20 Hz), low-pass filters 156 may be used between each device and the corresponding ADC 142.

The controller 122 may handle multiple data control elements including signal processing and noise reduction, tracking of error, and tabulation of data from raw signals to output. As the HALOS 100 may provide output in the form of temperature and relative humidity measurements which may be functionally dependent upon the air temperature and pressure for any concentration of water vapor, signals from the thermistor 154 and/or the pressure transducer 152 (which may be, but are not required to be, low-speed signals with $\tau \approx 0.2$ s) may be used to reduce the size of the fitting manifold. This may enable simpler A x=B matrix equations abstracted from Equation (1) to be solved, where A is the spectroscopy expected concentration matrix (tabulated from known values), x is a row vector of fitting coefficients (to account for pressure, temperature, and path length), and B is a signal from the detector 118 (e.g., a measurement detector). The subsequent calculations may be performed following a correction for length of an associated measurement cell 112 (e.g., based on control signals associated with orientations of the mirrors 132) and/or wavelength of the measurement light 108.

In some embodiments, the signal A may be held on the included memory 126 (e.g., ROM). The signal B may hold 16 binned discretizations in a desired wavelength range (e.g., between 1717.5 and 1718.5 $cm^{-1}$). A dynamic binning routine (wavelength discretized into 16 bins) which accounts for laser jitter may be cross-corelated with the output from each measurement detector 118 (e.g., detector 118*a* in FIG. 1B). The coaveraged detector 118 input streams may be cross correlated with the injection current for the light sources 102 and voltage measurements to ensure the proper abscissa is maintained for binning. Further, coaveraging may reduce noise by the square root of the number of samples taken such that variance may subsequently be preserved. Each row of B may then be populated the negative of the natural logarithm of an augmented ratio of the detector 118 signals and a constant. Output from the reference detector 118 (e.g., detector 118*b* in FIG. 1B) may enable tracking instantaneous power jumps and serve as a reference intensity divided by a constant.

Referring generally to FIG. 1E, it is to be understood that FIG. 1E and the associated description is provided solely for illustrative purposes and should not be interpreted as limiting.

Referring now to FIG. 3, various aspects of the design and configuration of the HALOS 100 for mounting on or integration with an aircraft are described in greater detail, in accordance with one or more embodiments of the present disclosure.

In some embodiments, the HALOS 100 includes a frame 302 to define the open measurement cavity 120 that includes the one or more measurement cells 112. FIG. 3 is a perspective view of the frame 302, in accordance with one or more embodiments of the present disclosure. This frame 302 may then be mounted to or otherwise integrated with an aircraft body. For example, FIG. 3 includes an inset 304 including an image of a non-limiting mounting location of the HALOS 100 on an aircraft body 306.

In some embodiments, the frame 302 includes a mounting plate 308 and one or more sides 310 arranged to define an open measurement cavity 120 through which air may freely flow. The frame 302 and/or the constituent sides 310 may form an open measurement cavity 120 having any shape. Further, the frame 302 and/or the constituent sides 310 may be shaped to provide stable flow of air through the open measurement cavity 120 as the aircraft is in flight. For example, the frame 302, or a portion thereof including the sides 310, may be shaped as an airfoil. As an illustration, the airfoil, or any portion thereof, may include a NACA (National Advisory Committee for Aeronautics) shape. As another illustration, the frame may be symmetric (e.g., with respect to a direction of air flow through the open measurement cavity 120) and/or may be shaped to mitigate vibration from aero-thermo-elastic loading during operation (e.g., operation at speeds achievable by a selected aircraft).

In some embodiments, the frame 302 includes various optical components including, but not limited to, mirrors, to form the one or more measurement cells 112 for the measurement light 108. For example, FIG. 3 illustrates two measurement cells 112 of different lengths for two probe beams (measurement light 108).

In some embodiments, at least a portion of the various components of the HALOS 100 are located in one or more housings configured to be located internal to an aircraft. In this way the size and complexity of the frame 302 and any components located therein may be limited, which may increase the mechanical rigidity of the frame 302 and/or the dynamics of air flow through the open measurement cavity 120.

In some embodiments, at least one of the housings configured to be located internal to the aircraft provides a positive pressure of a selected gas (e.g., nitrogen, or the like). For example, it is contemplated herein that housing components such as, but not limited to, the reference detector 118, the light sources 102, or at least some of the optical elements associated with the HALOS 100 may be located in a housing with positive pressure to mitigate spectral dispersion thus enable a high precision reference or zero measurement. As a result, the accuracy of a corresponding atmospheric measurement of the HALOS 100 may be correspondingly accurate.

In some embodiments, at least a portion of the components associated with the HALOS located internal to the aircraft are located in a housing providing a controlled pressure environment (e.g., positive pressure environment) of a selected gas composition (e.g., nitrogen, or the like). For example, it is contemplated herein that locating components such as, but not limited to, the reference detector, the laser sources, or at least some of the optical elements associated with the system in a housing to provide a controlled pressure environment may mitigate spectral dispersion thus enable a high precision reference or zero measurement. As a result, the accuracy and/or sensitivity of a corresponding atmospheric measurement may be improved relative to alternative configurations.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A high-altitude atmospheric sensor comprising:
   a frame configured to attach to a body of an aircraft, wherein the frame defines an open measurement cavity for air to travel through during flight of the aircraft;
   one or more light sources providing input light;
   a beamsplitter to separate the input light into measurement light propagating along a measurement path and reference light propagating along a reference path;
   one or more measurement cells providing optical paths for the measurement light in the open measurement cavity of the frame;
   one or more detectors to capture the measurement light from the one or more measurement cells and the reference light; and
   a controller including one or more processors configured to execute program instructions causing the one or more processors to generate one or more spectroscopy measurements of air passing through the open measurement cavity during the flight of the aircraft.

2. The high-altitude atmospheric sensor of claim 1, wherein at least one of the one or more light sources comprises:
   a quantum cascade laser.

3. The high-altitude atmospheric sensor of claim 1, wherein at least one of the one or more light sources comprises:
   a distributed feedback quantum cascade laser.

4. The high-altitude atmospheric sensor of claim 1, wherein the input light from at least one of the one or more light sources comprises narrowband light having a wavelength swept through a selected wavelength range in a periodic pattern.

5. The high-altitude atmospheric sensor of claim 4, wherein the selected wavelength range includes at least some wavelengths in a mid-infrared spectral region.

6. The high-altitude atmospheric sensor of claim 1, wherein the input light from at least one of the one or more light sources is pulsed with a repetition rate of at least 1 kHz.

7. The high-altitude atmospheric sensor of claim 1, wherein the input light from at least one of the one or more light sources is pulsed with a repetition rate of at least 100 KHz.

8. The high-altitude atmospheric sensor of claim 1, wherein at least one of the one or more measurement cells comprises a multi-pass cell.

9. The high-altitude atmospheric sensor of claim 8, wherein a propagation length of the measurement light through the multi-pass cell is in a range of 3 centimeters to 30 meters.

10. The high-altitude atmospheric sensor of claim 8, further comprising:
    one or more adjustable mirrors to adjust a propagation length of the measurement light through the multi-pass cell to adjust an interaction length of the measurement light with the air passing through the open measurement cavity during the flight of the aircraft.

11. The high-altitude atmospheric sensor of claim 1, wherein the one or more measurement cells comprise two or more measurement cells, wherein propagation lengths of the measurement light through the two or more measurement cells are different.

12. The high-altitude atmospheric sensor of claim 1, further comprising:
    a variable geometry mirror to maintain a stable path of the measurement light through at least one of the one or more measurement cells over a selected range of atmospheric conditions.

13. The high-altitude atmospheric sensor of claim 1, further comprising:
    one or more housings configured to be mounted internal to the body of the aircraft, wherein the reference path is located within a first of one of the one or more housings.

14. The high-altitude atmospheric sensor of claim 13, wherein at least the first of the one or more housings provides a positive pressure of a selected gas composition relative to a surrounding environment.

15. The high-altitude atmospheric sensor of claim 14, wherein the selected gas composition includes nitrogen.

16. The high-altitude atmospheric sensor of claim 1, wherein the frame is symmetric with respect to a direction of flight of the aircraft.

17. The high-altitude atmospheric sensor of claim 1, wherein at least a portion of the frame is shaped as an air foil.

18. A method comprising:
    flowing air through a frame attached to a body of an aircraft, wherein the frame defines an open measurement cavity for the air to travel through during flight of the aircraft; and
    generating one or more spectroscopy measurements of the air passing through the open measurement cavity during the flight of the aircraft, wherein the one or more spectroscopy measurements are generated by:
        providing input light with one or more light sources;
        separating the input light into measurement light propagating along a measurement path and reference light propagating along a reference path, wherein the measurement path includes a path through one or more measurement cells providing optical paths for the measurement light in the open measurement cavity of the frame;
        capturing the measurement light from the one or more measurement cells and the reference light with one or more detectors; and
        generating the one or more spectroscopy measurements with signals from the one or more detectors.

19. The method of claim 18, wherein the input light from at least one of the one or more light sources comprises narrowband light having a wavelength swept through a selected wavelength range in a periodic pattern.

20. The method of claim 18, wherein at least one of the one or more measurement cells comprises a multi-pass cell, wherein the method further comprises:

adjusting a propagation length of the measurement light through the multi-pass cell to adjust an interaction length of the measurement light with the air passing through the open measurement cavity during the flight of the aircraft.

\* \* \* \* \*